United States Patent [19]
Lange

[11] Patent Number: 5,778,655
[45] Date of Patent: Jul. 14, 1998

[54] CHAIN LINK AND A METHOD FOR THE MANUFACTURE THEREOF

[75] Inventor: Espen Lange, Oslo, Norway

[73] Assignee: Kvaerner ASA, Lysaker, Norway

[21] Appl. No.: 858,515

[22] Filed: May 19, 1997

[30] Foreign Application Priority Data

Nov. 30, 1994 [NO] Norway .................. 952793

[51] Int. Cl.$^6$ ...................... B21L 3/00
[52] U.S. Cl. ............ 59/31; 59/78; 59/84; 59/93
[58] Field of Search ................ 59/1, 3, 31, 34, 59/78, 84, 90, 93, 35.1

[56] References Cited

U.S. PATENT DOCUMENTS

| | | | |
|---|---|---|---|
| 2,103,972 | 12/1937 | Harris | 59/84 |
| 2,132,733 | 10/1938 | Hammerbeck | 59/31 |
| 2,302,263 | 11/1942 | Schneck . | |
| 2,399,953 | 5/1946 | Temple . | |
| 2,439,522 | 4/1948 | Miller | 59/84 |
| 2,732,178 | 1/1956 | Chaney | 59/84 |
| 3,399,953 | 9/1968 | Sapers | 59/31 |
| 3,664,121 | 5/1972 | Camitz . | |
| 3,864,906 | 2/1975 | Cullen | 59/84 |
| 4,067,188 | 1/1978 | Takahashi . | |
| 4,185,454 | 1/1980 | Bergstrom et al. | 59/34 |
| 4,216,070 | 8/1980 | Debost | 59/84 |

FOREIGN PATENT DOCUMENTS

| | | |
|---|---|---|
| 633891 | 8/1936 | Germany . |
| 1200104 | 9/1965 | Germany . |
| 62-3848 | 1/1987 | Japan . |
| 146442 | 6/1982 | Norway . |
| 2132733 | 7/1984 | United Kingdom . |

*Primary Examiner*—David Jones
*Attorney, Agent, or Firm*—Merchant, Gould, Edell, Welter, and Schmidt

[57] ABSTRACT

A chain link (1) consists of two loops (2a, 2b) and two sides (3a, 3b), and a post (5) welded in between the chain link's sides (3a, 3b). The post (5) has sections (7) of reduced thickness against the chain link's sides (3a, 3b) in order to produce weld grooves for welding the post (5) to the chain link's sides (3a, 3b) with a through-weld. A sacrificial anode (9) is affixed around the chain link's post (5), by means of casting, welding or clamping.

8 Claims, 2 Drawing Sheets

CHAIN LINK AND A METHOD FOR THE MANUFACTURE THEREOF

The invention concerns a chain link and a method for the manufacture thereof, which chain link consists of two loops and two sides, wherein the distance between the loops constitutes the length of the chain link, and the distance between the sides constitutes the width of the chain link, and wherein a post is welded in between the sides of the chain link.

Chains are used for a great many applications involving the transfer of tensile forces, for example for towing and mooring ships and oil platforms. Chains can be made of various materials, for example steel, wrought iron or plastic, but in the case of applications involving the transfer of large forces, chains made of steel or steel alloys are predominant.

Chain links of steel can be manufactured by forging, casting, bending of bars and welding them together, or by a combination of these methods. Chain links for chains which are intended to transfer large forces can have a centre post, as this is an advantage from the point of view of strength. In this case this post is normally kept in position in the link by means of a clamping effect.

The present invention may be used with advantage in a chain link of the type which is manufactured by bending a bar with subsequent welding together of the ends of the bar. Cast and forged chains are normally more expensive due to the production method, and are not the subject of the invention.

Steel alloys which are used for chains for transferring large tensile forces must have a very high tensile strength and ductility. Chains which are employed at sea are subject to corrosion from the sea water, and in order to avoid having to replace the chains too frequently it is desirable to find a means of preventing this corrosion.

Many methods have been proposed for solving the problem of corrosion of chains. One obvious solution appears to be the use of corrosion-resistant steel alloys. However, this is expensive, and at the same time the corrosion-resistant steel alloys have mechanical properties which are inferior to the best alloys which are employed for chains.

A second proposed solution is the use of different surface coatings, for example painting, galvanizing or asphalt. Due to the friction between the links such coatings will be highly subject to wear, and will have only a short-lived effect.

A third solution is to use sacrificial anodes, i.e. pieces of metal with a lower electrochemical potential than the alloy in the part which has to be protected, i.e. the chain link, and in good electrical contact with it. An electrical voltage will be established between the sacrificial anode and the chain link, which causes the sacrificial anode to corrode instead of the chain link. Examples of metals which can be used in sacrificial anodes for protecting steel include zinc, aluminium and magnesium.

Since the loops of the chain link are subject to wear, the only practical location for the galvanic anode is on the post. U.S. Pat. No. 2,399,953 describes a chain link with centre post wherein two C-shaped chain half-links formed from a bar material are designed with recesses in the end surfaces of the bars. The two chain half-links are placed against each other, the recesses thus forming cavities with opening inwards and outwards, and a centre post, preferably in the form of a straight cylinder, with a diameter slightly larger than the openings which face inwards, is placed between the openings in such a manner that they are covered by the post. The cavities are filled with a fusible material which is fused and in turn fuses the base material in the chain half-links and the post, thus forming a kind of welding of the post.

U.S. Pat. No. 4,067,188 describes a chain link with post which is manufactured by heating a steel bar and bending it into an oval shape in such a manner that the two ends of the bar are located against each other on the longitudinal side of the oval, thus forming a chain link. A post is inserted in the chain link with one end abutting against the ends of the bar, whereupon the chain link is cooled, thus shrinking the post into position. The ends of the bar are welded together, with the side effect that the post is partially welded on, thus forming, a finished chain link.

U.S. Pat. No. 2,302,263 describes a chain link where a post, constructed with grooves at the ends, is pressed in between the sides of the chain link, thus forming a chain link with post where the post is clamped in position.

UK 2 132 733 describes a chain link with post where U-shaped anode elements are fastened around the post.

NO 146 442 describes a chain link with post, where either the outermost layer of the post or the entire post is made of anodic material.

Thus it is known to provide a post in the chain link and to supply this post with a sacrificial anode. The known solutions function well per se as long as the chain is new, but after it has been used for a time the electrical connection between the post and the rest of the chain link is reduced due to corrosion and mechanical stresses. Consequently the electrical current between the sacrificial anode and the chain link is obstructed, with a reduction in corrosion protection as a result.

Even though the post is attached as described in U.S. Pat. No. 4,067,188 (welding on one side) or U.S. Pat. No. 2,399,953 (welding on both sides), the connection between the post and the rest of the chain link will be subject to corrosion and mechanical stresses, especially fatigue, since attachment with the two said methods does not provide complete welding. After a time this will cause the post to loosen, thus reducing the electrical connection between the post and the rest of the chain link, and resulting in a deterioration of the function of the sacrificial anode. It should also be noted that the two said welding methods provide welded joints which are difficult to check with non-destructive testing methods. It should further be mentioned that attachment of the post with the two said welding methods involves the use of a post with a relatively large diameter, which in turn means that the attachment of the sacrificial anode becomes impractical and that due to problems of space the sacrificial anode becomes smaller than desirable.

Apart from the fact that a loose post is unsatisfactory for the sacrificial anode, a loose post results in a dramatic reduction in the chain link's fatigue strength, which can mean that the chain breaks earlier than expected.

The present invention may be used to provide a chain link of the type which is manufactured by bending a bar with subsequent welding together of the ends of the bar, wherein by providing a post between the sides of the chain link, it should be possible to place thereon a sacrificial anode which should be able to function after the chain has been used for a long time in sea water, and at the same time the chain link's fatigue strength should be maintained after long term use. Thus it is an object to provide a chain which has the same properties in use as a forged or cast chain, but at a lower manufacturing cost.

This object is achieved with a device of the type mentioned in the introduction, characterized by the features presented in the claims.

The invention therefore comprises a chain link consisting of two loops and two sides, and a method for the manufacture thereof, wherein the distance between the loops constitutes the length of the chain link, and the distance between the sides constitutes the width of the chain link, and wherein a post is welded in between the sides of the chain link, and the invention is characterized in that, in a direction transverse to the plane of the chain link, the post has a reduced thickness against the sides of the chain link in order to produce weld grooves for welding the post to the sides of the chain link, and that the welding seam is a through-weld for the entire cross section of the post in the contact areas to the sides of the chain link.

In a preferred embodiment the post has a central section which is relatively narrow in the chain link's longitudinal direction, thus more easily allowing a sacrificial anode to be affixed to the post. The post makes a transition into wider sections against the sides of the chain link into which the post is welded.

In the manufacture of the chain link with the method according to the present invention, the chain link preferably is first manufactured in the same way as for a chain link without a post, i.e. a bar or wire is cut into suitable lengths, each length is bent into an oval shape, possibly by heating, whereupon the ends are welded together thus forming a chain link. Thus it is possible to employ a standard chain link as the basis for the chain link according to the invention.

The post is manufactured separately. This can be done in various ways, e.g. by an automated forging process, where the post is forged from a blank and directly receives its finished shape. The post is then placed inside the chain link, and temporarily held in position by means of suitable devices. Thereafter the post is welded into the chain link, either with a suitable automatic welding process or manually.

In a preferred method according to the invention the chain link is heat treated after the post has been welded in, thus improving the chain link's mechanical properties.

Finally the sacrificial anode is attached. This can be carried out, e.g., by clamping, welding, casting or by means of screws. The preferred method of attaching the sacrificial anode is by casting, since this method is suitable for automation, while at the same time good contact is obtained, and consequently a good electrical connection, between the post and the sacrificial anode.

There is no description herein of how the chain links are assembled into a chain, since this is performed in the normal known manner, and falls outside the scope of the invention.

Thus by using the method according to the invention it is possible to provide a chain link of the type which is manufactured by bending a bar and subsequently welding the ends together, wherein by welding in a post, a sacrificial anode can be provided which achieves good electrical contact with the rest of the chain link.

By welding in the post according to the present invention an improvement is obtained in the fatigue strength in the weld between the post and the sides of the chain link. During long term use this prevents the post from working loose, which maintains the electrical connection between the post and the rest of the chain link, and consequently between the sacrificial anode and the chain link, thus maintaining the corrosion protection. At the same time the chain link's fatigue strength is maintained by preventing the post from loosening.

By welding in a post in accordance with the method according to the invention, a chain link is also obtained with more uniform quality than by other known welding methods, since a welding method can be used for the welding process which is directly aimed at the welding in of the post, and not as in the known methods a welding method which is primarily aimed at welding together the link. In addition an improvement is obtained in the possibility for checking by non-destructive testing, for example by ultrasonic examination or X-ray, as the weld is a complete through-weld.

A chain link is thus provided wherein the post is integrated with the rest of the chain link, as in the case of a cast or forged chain link, but at a lower cost.

The invention will now be explained in more detail by means of a specific embodiment, with reference to the drawing, in which.

For ease of understanding the same reference numerals are used for corresponding parts in all the figures.

Figure 1:
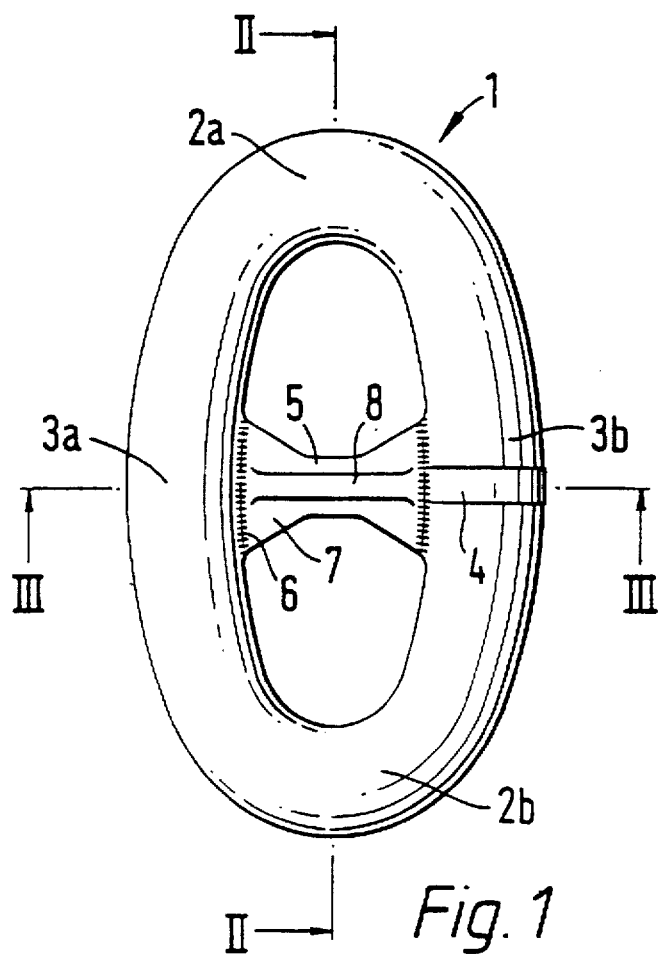
FIG. 1 is a sectional elevation of a chain link according to the invention.
Figure 3:
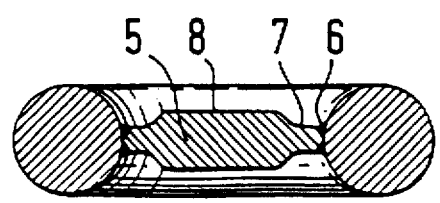
FIG. 3 is a cross section of the chain link in FIG. 1 along line III—III.

FIG. 1 illustrates a chain link 1 consisting of two loops 2a and 2b, two sides 3a and 3b and a post 5. The sides of the chain link are attached to each other in a weld 4, which is a complete through-weld. The post 5 has reduced thickness in sections 7 which are located against the sides of the chain link, thus forming grooves for through-welded joints 6, see FIG. 3. A post central section 8 between the sections 7 is narrower than the sections 7, thus providing space for attaching a sacrificial anode 9 around the section 8.

Figure 2:
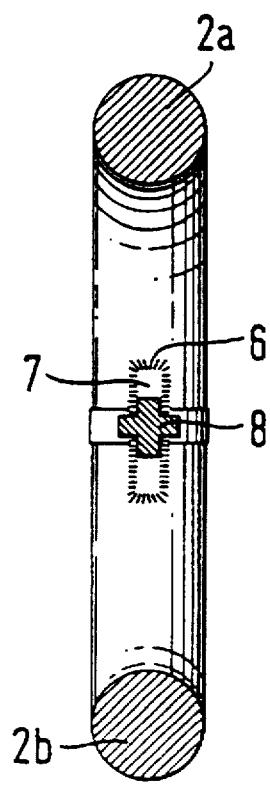
FIG. 2 is a cross section of the chain link in FIG. 1, along line II—II.

In FIG. 2 the central section 8 is illustrated in cross section. The central section 8 is in the shape of a cross in order to obtain good electrical contact when attaching the galvanic anode 9.

Figure 4:
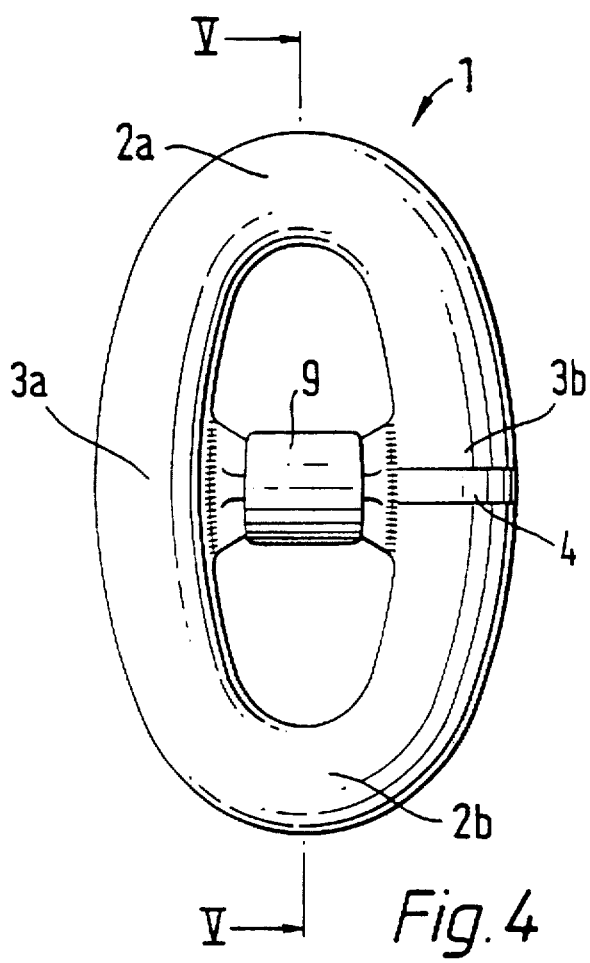
FIG. 4 is a sectional elevation of a chain link according to the invention, with a sacrificial anode mounted thereon.
Figure 5:
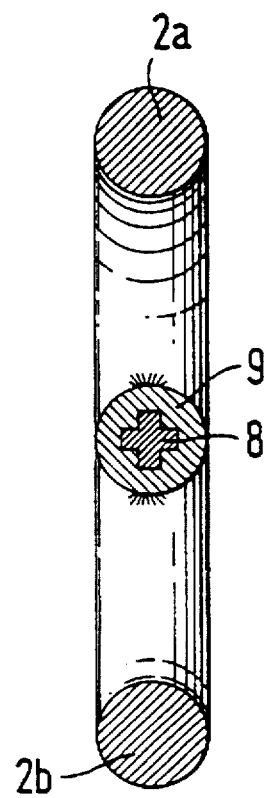
FIG. 5 is a cross section of the chain link in FIG. 4 along line V—V.

FIGS. 4 and 5 illustrate the post with a sacrificial anode 9 cast around the central section. As illustrated in FIG. 5 the sacrificial anode 9 fits tightly around the central section 8, thus providing the best possible electrical connection between the sacrificial anode 9 and the post 5. FIG. 4 illustrates the geometrical relations between the post's side sections 7 and the sacrificial anode 9, these projecting almost equally far out into the space which will be filled by a loop in a second chain link in the formation of a chain.

In the above the invention has been explained with regard to a specific embodiment. However, the invention can be varied within the scope of the claims. In the illustrated embodiment the shape of the sections 7 is such that the thickness increases steadily from the weld 6 to the central section 8 (see FIG. 1), since this shape is favourable with respect to stress-distribution. At the same time the width of the sections 7 is steadily reduced from the welds 6 in towards the central section 8. However, it is possible to design this transition in another manner, e.g. curved or graduating, which could be favourable if, e.g., the post is made of a bar, and the sections 7 are shaped by a clamping/compression process. The section 8 is in the shape of a cross in order to obtain good electrical contact with the sacrificial anode, but it is obvious that this section can also have another shape, e.g. round or rectangular.

An example of an alternative to the method according to the invention is that the bar blank which forms the chain link is bent and welded while hot, whereupon the post is inserted while the chain link is still hot. Gentle pressure on the chain link will hold the post temporarily in place until the post has been welded into position.

We claim:

1. A chain link comprising:

two loops and two sides, wherein a distance between the loops constitutes a length of the chain link, and a distance between the sides constitutes a width of the chain link; and a post welded in between the chain link's sides, wherein adjacent the chain link's sides the post has reduced thickness with respect to other parts of the post in a direction transverse to a plane of the chain link, in order to produce weld grooves for welding the post to the chain link's sides, and for allowing entire contact areas of the post to be through-weld to the chain link's sides.

2. The chain link according to claim 1, wherein the post further comprises a central section which is narrower than other parts of the post in a longitudinal direction of the chain link and wherein the post gradually widens towards the chain link's sides.

3. The chain link according to claim 1, wherein the chain link is heat treated after the post has been welded in.

4. The chain link according to claim 1, further comprising a sacrificial anode affixed around the chain link's post.

5. A method for manufacturing a chain link including two loops and two sides, wherein a distance between the loops constitutes a length of the chain link, and a distance between the sides constitutes a width of the chain link, and wherein a post is welded in between the chain link's sides, the method comprising:

providing a post, wherein adjacent the chain link's sides the post has reduced thickness with respect to other parts of the post in a direction transverse to a plane of the chain link, in order to produce weld grooves for welding the post to the chain link's sides, and for allowing entire contact areas of the post to be through-weld to the chain link's sides; and through-welding the entire contact areas of the post to the chain link's sides.

6. The method according to claim 5, further comprising providing the post with a central section which is narrower than other parts of the post in a longitudinal direction of the chain link and wherein the post gradually widens towards the chain link's sides.

7. The method according to claim 5, further comprising heat treating the chain link after the post has been welded in.

8. The method according to claim 5, further comprising affixing a sacrificial anode to the chain link's post, wherein the sacrificial anode is affixed by casting, welding or clamping.

* * * * *